United States Patent
Maffezzoni et al.

(10) Patent No.: US 7,398,004 B1
(45) Date of Patent: Jul. 8, 2008

(54) SOFTWARE METHODS FOR AUTHORING MULTIMEDIA CONTENT TO BE WRITTEN TO OPTICAL MEDIA

(75) Inventors: Guido Maffezzoni, San Jose, CA (US); Brent Silveria, Livermore, CA (US); Kahren Arzoumanian, San Jose, CA (US)

(73) Assignee: Sonic Solutions, Novato, CA (US)

( * ) Notice: Subject to any disclaimer, the term of this patent is extended or adjusted under 35 U.S.C. 154(b) by 1337 days.

(21) Appl. No.: 10/272,787

(22) Filed: Oct. 16, 2002

Related U.S. Application Data

(60) Provisional application No. 60/330,204, filed on Oct. 16, 2001.

(51) Int. Cl.
*H04N 5/93* (2006.01)
(52) U.S. Cl. .......................... 386/55; 386/52
(58) Field of Classification Search .................. 386/45, 386/125–126, 52, 55; 715/723; 707/1, 100, 707/200; 345/156, 501
See application file for complete search history.

(56) References Cited

U.S. PATENT DOCUMENTS

| | | | |
|---|---|---|---|
| 4,533,188 A | 8/1985 | Miniet | |
| 5,237,648 A | 8/1993 | Mills et al. | |
| 5,303,388 A | 4/1994 | Kreitman et al. | |
| 5,355,450 A | 10/1994 | Garmon et al. | |
| 5,359,712 A | 10/1994 | Cohen et al. | |
| 5,404,316 A | 4/1995 | Klingler et al. | |
| 5,442,744 A * | 8/1995 | Piech et al. | 715/500.1 |
| 5,513,306 A | 4/1996 | Mills et al. | |
| 5,565,888 A | 10/1996 | Selker | |
| 5,726,717 A | 3/1998 | Peters et al. | |
| 5,812,216 A | 9/1998 | Peters et al. | |
| 5,852,435 A | 12/1998 | Vigneaux et al. | |
| 5,883,670 A | 3/1999 | Sporer et al. | |
| 5,930,446 A | 7/1999 | Kanda | |
| 5,966,121 A | 10/1999 | Hubbell et al. | |
| 5,995,115 A | 11/1999 | Dickie | |
| 5,999,173 A | 12/1999 | Ubillos | |
| 6,002,403 A | 12/1999 | Sugiyama et al. | |

(Continued)

FOREIGN PATENT DOCUMENTS

JP 10117322 5/1998

(Continued)

OTHER PUBLICATIONS

Davis, Marc, "an iconic visual language for video annotation", 21 pages, <http://www.w3.org/People/howcome/p/telektronikk-4-93/Davis_M.html>.

(Continued)

*Primary Examiner*—Robert Chevalier
(74) *Attorney, Agent, or Firm*—Martine Penilla & Gencarella, LLP

(57) ABSTRACT

A computer implemented method for authoring a multimedia compact disc is provided. The method includes obtaining multimedia content from at least one source and enabling manipulation of the obtained multimedia content. The method further includes arranging the obtained multimedia content in a graphical hierarchical tree structure. The arranging of the multimedia content graphically defines the hierarchical arrangement relative to other multimedia content to be recorded to the multimedia compact disc.

21 Claims, 11 Drawing Sheets

U.S. PATENT DOCUMENTS

| | | |
|---|---|---|
| 6,204,840 B1 | 3/2001 | Petelycky et al. |
| 6,628,889 B2 | 9/2003 | Inoue |
| 2003/0163519 A1 * | 8/2003 | Kegel et al. .................. 709/203 |

FOREIGN PATENT DOCUMENTS

| | | |
|---|---|---|
| WO | WO 96 19779 | 6/1996 |
| WO | WO 96 31822 | 10/1996 |
| WO | WO 96 31829 | 10/1996 |

OTHER PUBLICATIONS

European Search Report dated Aug. 16, 2000.

\* cited by examiner

SOFTWARE METHODS FOR AUTHORING MULTIMEDIA CONTENT TO BE WRITTEN TO OPTICAL MEDIA

CROSS REFERENCE TO RELATED APPLICATIONS

This application claims benefit from U.S. Provisional Patent Application No. 60/330,204, entitled Method and code for Authoring Multimedia Content to be Written to Optical Media, filed on Oct. 16, 2001, and is hereby incorporated by reference.

BACKGROUND OF THE INVENTION

1. Field of the Invention

The present invention relates generally to the recording of video, photo, and multi-media onto optical media, and more particularly to a method and apparatus for easily capturing and editing images and multi-media, and for authoring optical media containing video, photo, image, and other multi-media presentations.

2. Description of the Related Art

The convergence of photography, video, and motion picture industries with the computer industry is greatly expanding the photo, video, and other image options for the consumer. The use of optical media such as CD-R, DVD, and the like, is rapidly becoming a viable option for business as well as personal applications. By way of example of a business application, equipment manufacturers can record maintenance and service procedures, and then transfer the recorded procedures to optical media to ship with a tool to customers, or to ship to field technicians. Customer or support personnel can then simply play the optical media in a convenient computer system to observe and learn necessary procedures as correctly demonstrated. Personal applications include photo and video capture to create everything from photo albums to multi-media collections of movies, images, photos, and the like.

Although the possibilities for the use and application of video media seem limited only by the boundaries of the imagination, the technical expertise required to assemble, edit, and author DVD and other optical media containing collections and presentations of video, photographic, image, and multi-media data has kept the expansion of the market in check, and beyond the resource and skill of the average consumer.

Typical prior art video authoring programs tend to be limited in scope so that specialized functions are accomplished with different programs. By way of example, one program might be required to capture and edit video data, another program might be required to capture and edit photographic data, and another program required to collect the data in a presentation format. Further, some prior art programs offer only standard templates into which a user can insert video or photographic files with little or no option for personalization or modification. If a prior art program does provide for user modification, edit and display is typically restricted to one content file and one content file type at a time.

Prior art authoring software often presents technical barriers preventing wide general use and enjoyment. By way of example, structuring of the photo, video, or other image content is generally presented in abstract file and folder hierarchical format. The non-technical user has no visual representation of structure and format using actual photo, video, or other image content. The un-skilled user with little experience authoring DVD or VIDEO CD projects is provided no tools or visual reference to associate the abstract file and folder structure with the ultimate video, photo, or other image DVD. The difficulty of creating even the abstract structure that will be a presentation is compounded by requiring the user to navigate through a plurality of screens and functions that are generally arcane to the average consumer, and bear little or no resemblance to a DVD presentation that one can experience by simply inserting a disc into a DVD player connected to the home television set.

In view of the foregoing, there is a need for a method and apparatus and computer program for easily capturing and editing video, photographic, and other image data, and then authoring DVD, VIDEO CD, and Super Video CD presentations to be recorded to the optical media. The method, apparatus, and computer program should provide an average computer user an effective and intuitive interface to capture and edit video, photographic, and other image content from a plurality of sources, and to collect, structure, and arrange the selected content to author DVD, VIDEO CD, and Super Video CD presentations. The method, apparatus, and computer program should further provide the user with a visual, graphic workspace in which to arrange and create presentations and projects including a plurality of content and content formats that can be easily structured using common methods and commands familiar to the typical user.

SUMMARY OF THE INVENTION

Broadly speaking, the present invention fills these needs by providing a method, apparatus, and computer program that presents a complete solution for creating DVD, VIDEO CD (VCD), and Super Video CD (SVCD), from capture and edit to authoring and recording. The present invention can be implemented in numerous ways, including as a process, an apparatus, a system, a device, a method, or a computer readable media. Several embodiments of the present invention are described below.

In one embodiment, a computer implemented method for authoring a multimedia compact disc is disclosed. The method includes obtaining multimedia content from at least one source and enabling manipulation of the obtained multimedia content. The method further includes arranging the obtained multimedia content in a graphical hierarchical tree structure. The arranging of the multimedia content graphically defines the hierarchical arrangement relative to other multimedia content to be recorded to the multimedia compact disc.

In another embodiment, computer readable media containing program instructions for authoring a multimedia compact disc is disclosed. The computer readable media includes program instructions for obtaining multimedia content from at least one source and program instructions for enabling manipulation of the obtained multimedia content. Program instructions for arranging the obtained multimedia content in a graphical hierarchical tree structure is also included. The arranging of the multimedia content graphically defines the hierarchical arrangement relative to other multimedia content to be recorded to the multimedia compact disc.

In yet another embodiment, a method for the authoring of DVD is disclosed. The method includes providing a graphical user interface having a capture window and a workspace window. The workspace window enables the organization of media content for recording to an optical media, and the method enables access to raw media content to be processed in the capture window. Processed media is moved from the capture window to the workspace window where the content is structured using a graphical representation of the parent and child relationships between a plurality of media content.

In still another embodiment, a computer readable media having program instructions for the creation of DVD, VIDEO CD, and Super Video CD is disclosed. The computer readable media includes program instructions for presenting a graphical user interface having a capture window and a workspace window. The workspace window enables the organization of image content and any associated audio content for recording to optical video media. An organizational structure defining optional presentation links for content sequences is enabled in the workspace window, and access to un-edited content to be processed is enabled in the capture window. The computer readable media includes program instructions that further provide for the processed content to be added to the organizational structure, and for the organizational structure to be manipulated as desired. The addition of graphics, text formatting, video display effects, and audio to the organizational structure are further provided, and the computer readable media includes program instructions to record the content of the organizational structure to the optical video media.

In another embodiment, a computer implemented method for the authoring of DVD, VIDEO CD, and Super Video CD is disclosed. The computer implemented method includes providing a capture window and a workspace window. The workspace window enables the organization of image content presentation and any associated audio content to be recorded to optical video media, and the capture window enables the access to un-edited content to be processed. The computer implemented method further provides for the processed content to be added to the workspace window where it is graphically manipulated to define an organizational structure including presentation options for content sequences. The computer implemented method enables the creation and addition of graphics selections, text customization, content transitions, video display effects and audio effects to the organizational structure. The structured content can be previewed on the graphical user interface, and the computer implemented method additionally provides for recording the structured content to the optical video media.

The advantages of the present invention are numerous. One notable benefit and advantage of the invention is enabling generally un-skilled computer users the access to video, photo, and other image content authoring. The present invention implements typical and common computer methods and commands to enable the average consumer to be able to capture and edit video, photo, and other image content from a plurality of sources, and to create a DVD, VIDEO CD, and Super Video CD containing a presentation of the content and which can be played on a typical consumer DVD player.

Another benefit is the graphical user interface which presents a capture window and a workspace window. The capture window displays video, photo, and other image content from a plurality of sources including video, digital or analog photographic, scanner or other twain sources, television, computer hard drive or peripheral drive, network and internet, as well as audio sources such as a computer microphone, CD player, or MP3 files. The present invention provides for the capture and edit of a plurality of source files used by the most basic to the very advanced computer user.

An additional benefit is the workspace window of the present invention that provides a visual, graphic representation of sequence relationships and structures. The plurality of media content is displayed as thumbnail images, and can be presented in sequences that can be manipulated, created, deleted, arranged and organized in accordance with user preferences to author individual and precise presentations without requiring the technical skill and expertise needed for prior art. A user can see and create structural relationships between and among the image content using a hierarchical tree familiar to typical users through such programs as, for example, Windows® Explorer, but using thumbnails of image content instead of files and folders. The visual representation of the structure, menus, and sequences enables typical users to author DVD content from the very basic to the elaborate and sophisticated.

Yet another benefit is a plurality of editing options in addition to the menus and sequencing. Users can create transitions between images, movies, video, photos, and the like, and can add sound as desired. Menus can be specially created to reflect themes, and titles can be created and customized from the business professional to the very personal.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for capture, editing, authoring, and recording DVD, VIDEO CD (VCD) and Super Video CD (SVCD) is disclosed. In preferred embodiments, a computer implemented method and computer readable media include providing a graphical user interface having a workspace window and a capture window that are used to provide a complete solution for creating DVD, VCD, and SVCD from capture through editing, authoring, and then recording, also known as burning, an optical media.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
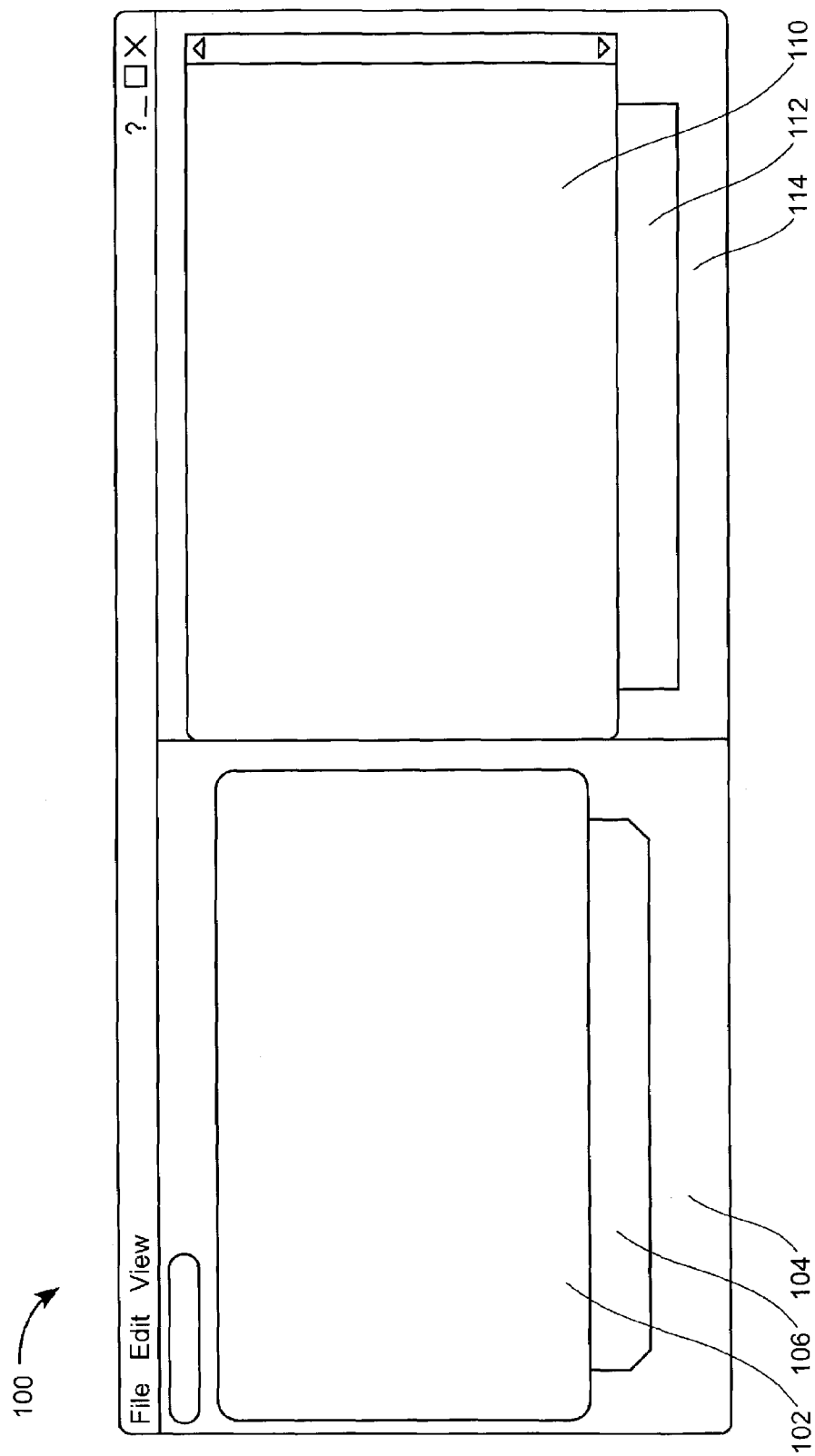
FIG. 1 shows a graphical user interface in accordance with one embodiment of the present invention.

FIG. 1 shows a graphical user interface (GUI) 100 in accordance with one embodiment of the present invention. The GUI 100 includes a capture window 102 and a workspace window 110. In one embodiment, the capture window 102 provides an area for the viewing and editing of image content. The image content can be from a plurality of sources, and in one embodiment, the GUI 100 provides an indication (not shown) of the image source. Examples of image content include video, photographic, scanned pictures and images, drawings, graphics, multimedia content, and the like. Examples of image content sources include digital and analog video, digital and analog photographs, television, hard drives, optical drives, peripheral devices, networked data, Internet content, and the like. In general, the data may be obtained or captured using any capture technique and using any device and interface.

In yet another example, the interface of the present invention also provides Real Time Recording and VR (Video Recording) support. In embodiments where Real Time Recording or VR recording is implemented, it is possible to obtain video content from a source (e.g., a video camera) and directly burn the video content to an optical disc. As this process allows the recording of data directly to the optical disc, it is not necessary to first transfer the video data to a hard drive, and then subsequently transfer the data from the hard drive to the optical disc. Example standards include, for example, "DVD+ReWritable—DVD+RW Video Format Specification", Version 1.1, System Description, September 2001, PHILIPS, and "DVD Specification for VIDEO RECORDING", Version 0.9, January 1999, DVD Forum. Each specifications is incorporated by reference herein.

In one embodiment of the present invention, the GUI 100 presents a source and file type selection and indication (not shown) for the user, and displays the content for viewing and editing in the capture window 102.

In one embodiment, capture and editing control space 106 is provided for control buttons (not shown) for the capturing and editing of image content displayed in the capture window 102. Examples of control buttons include play, pause, review, fast forward, stop, and the like. In one embodiment, image control buttons such as those listed are contained in the capture and editing control space 106, and editing control features (not shown) are contained in an editing control space 104. Examples of editing control features include coloring, brightness, contrast, resolution, sound splicing and mixing, image cropping control, image split and insert, and a plurality of effects such as fading, windowing, and the like. In one embodiment, a selection of a control group (not shown) activates a drawer, tray, pop-up menu, or similar feature containing groupings of related capture or editing features for use with the image content displayed in the capture window 102.

The workspace window 110 provides an area for the structuring and organizing of image content as is described in greater detail below. In one embodiment, the workspace window 110 includes a content information area 112. The content information area 112 can include such detail as the size of an image content file or sequence, the duration of an image content file or sequence, date of creation, and the like. In one embodiment, a workspace control area 114 is provided including control features (not shown) for manipulating image content and image content sequences. Examples of such control features include effects such as transitions, audio, titles, themes, and the like. In one embodiment, a control button to initiate the recording of a completed image content project is contained in the workspace control area 114.

Figure 2:
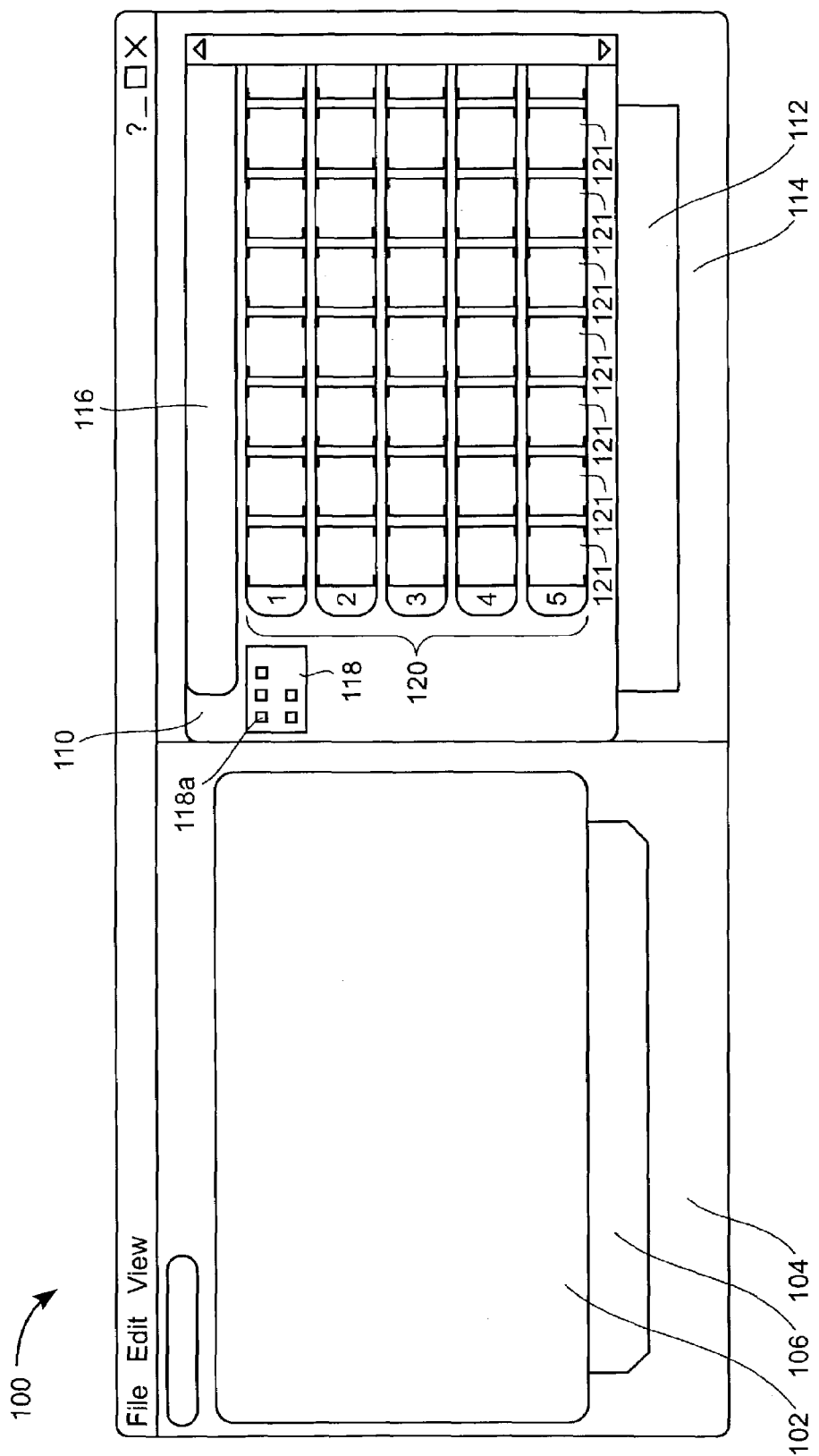
FIG. 2 shows a graphical user interface containing image content in the workspace window in accordance with an embodiment of the invention.

FIG. 2 shows a graphical user interface (GUI) 100 containing image content in the workspace window 110 in accordance with an embodiment of the invention. In FIG. 2, the image content includes five numbered sequences 120, and each sequence 120 is on the same level in the hierarchical structure. The structuring of image content sequences 120 is explained in greater detail below in reference to FIGS. 3-4 and 6A-6B. As used herein, a "sequence" should be interpreted broadly to mean at least one content file, and in some embodiments a collection or group of content files. These content files can be still images, a number of still images, video clips, video objects, audio objects, etc. The content files or objects, in some cases, are also referred to as movies or titles. Accordingly, the actual definition used or language used to describe the content should not limit the scope of the claimed inventions.

Each sequence 120 shown in FIG. 2 is numbered (1-5), and contains a thumbnail image 121 representing some image content. In one embodiment, the thumbnail image 121 is the first non-black image in the image content. Image content can include a video clip, a photograph, a movie, a scanned image, computer graphics files, and the like. In the example of a video clip, one embodiment of the present invention scans through the video data and displays the first non-black frame of the content as the thumbnail. In another embodiment, a sequence 120 can be a collection of photographs as might be presented in a photo album. Each thumbnail shows one of the photographs added to the sequence 120.

An exemplary main menu 118 is shown adjacent to the first numbered sequence 120. In one embodiment, the main menu 118 enables access for viewing each of the numbered sequences. The main menu 118 further enables access to any of a plurality of sub-menus (not shown in FIG. 2) in more complex hierarchical structures. In FIG. 2, buttons 118a are shown which correspond to the numbered sequences 120. As sequences 120 or sub-menus (not shown) are added, deleted, or in some manner re-structured, corresponding buttons 118a are added or deleted accordingly.

In addition to the numbered sequences 120, one embodiment of the present invention provides a start sequence 116. The start sequence 116 is not accessed through the main menu, and therefore has no corresponding button 118a. In one embodiment, the start sequence 116 is displayed when the DVD, or SVCD, is inserted into a DVD player. By way of example, commercially produced DVD's often begin with a copyright warning, or preview trailers. Such content is generally included in the start sequence 116. In one embodiment of the present invention, content may or may not be inserted into the start sequence 116. Examples of content that might be inserted into the start sequence include a personal greeting, a multi-media introduction to the DVD project, a favorite song, or any type of audio, image, or multi-media content desired according to user desire.

Figure 3:
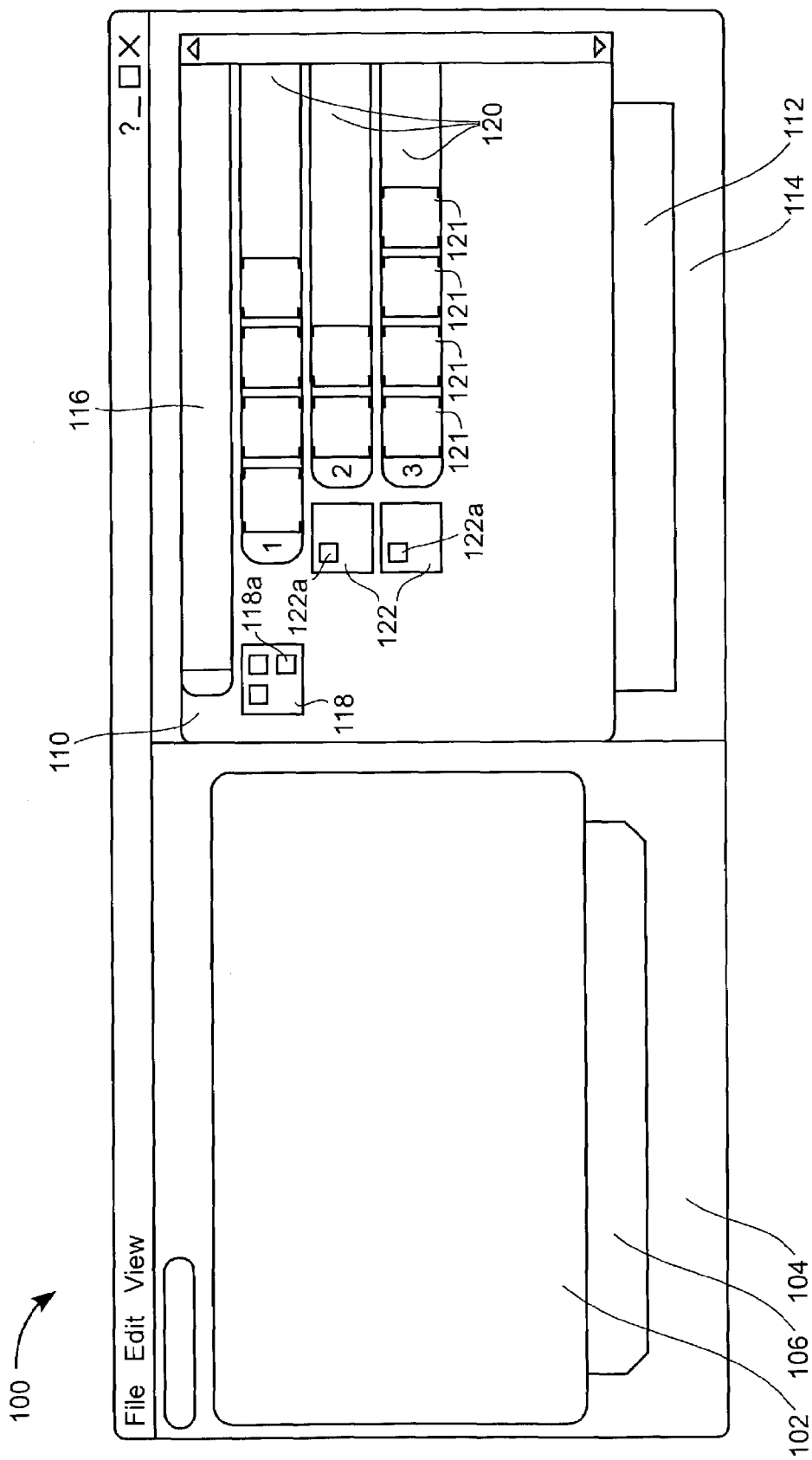
FIG. 3 shows a graphical user interface containing the creation of content hierarchy in the workspace window in accordance with one embodiment of the invention.

FIG. 3 shows a GUI 100 containing the creation of content hierarchy in the workspace window 110 in accordance with one embodiment of the invention. As can be seen in FIG. 3, the content sequences 120 are no longer at the same structural level. By way of example, sequence 2 and sequence 3 are indented under sequence 1. In one embodiment of the invention, FIG. 3 illustrates the creation of a structure into which image content will be placed, and not necessarily a completed structure. As can be seen in FIG. 3, sequences 2 and 3 each have a sub-menu 122 associated with the sequence. Neither of sequences 2 or 3, however, contain subordinate sequences (sub-sequences), also known as "children." A sub-menu 122 might seem unnecessary to either sequence 2 or sequence 3, but in one embodiment of the invention, a user can plan and lay out an entire structure prior to adding the content. In the example shown in FIG. 3, a sub-menu 122 corresponding to each of sequences 2 and 3 might indicate intention to add subordinate sequences, or additional sub-menus to each of the sequences. Should the user decide not to add more sequences associated with or subordinate to sequence 2 or 3, the associated sub-menu 122 is easily deleted.

Main menu 118 is shown with three buttons 118a. In the example illustrated in FIG. 3, one of the main menu buttons 118a is associated with the first sequence (sequence 1), and one of the buttons 118 is associated with each of the two sub-menus 122. Structure and access to each of the sequences 120 is further described below in reference to FIGS. 6A and 6B. In one embodiment, the placement of each multimedia content material may be provided by a thumbnail representation in each sequence. As such, the placement of each thumbnail defines a temporal placement relative to other thumbnails. For instance, a thumbnail on the left of a sequence will be played before a thumbnail on the right of a sequence. Of course, during playback, any sequence may be played first, second, etc., upon navigation through the hierarchical tree structure and selection of a sequence.

Figure 4:
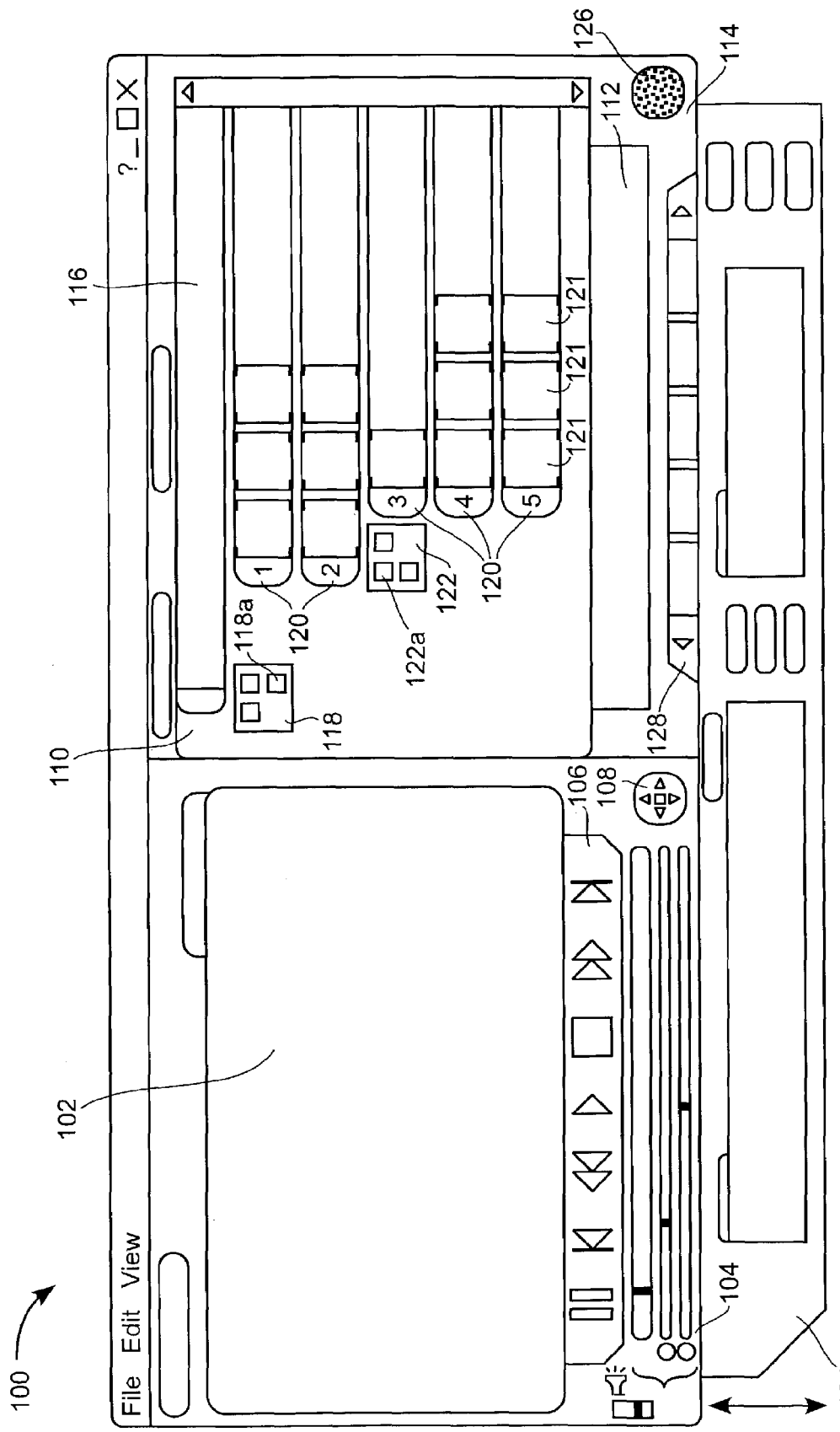
FIG. 4 illustrates a graphical user interface in accordance with another embodiment of the invention.

FIG. 4 illustrates a GUI 100 in accordance with another embodiment of the invention. Workspace window 110 includes content sequences 120 arranged in a simple hierarchical order. Sequences 1 and 2 are on the same level or order, and sequences 3, 4, and 5 are subordinate to sequence 2. Main menu 118 provides access through buttons 118a to sequences 1 and 2 and sub-menu 122, which is adjacent to sequence 3. Sub-menu 122 provides access to sequences 3, 4, and 5 through buttons 122a.

Below workspace window 110, workspace control area 114 is shown containing control features 128 for manipulating image content and image content sequences. By way of example, control features can include themes for menu and button design, control for titles and captions, transition controls, audio effects, and the like. In one embodiment, selection of a control feature 128 triggers a editing tray or drawer 124 containing a plurality of tools and design functions for creation and editing of the selected control feature.

Also shown in workspace control area 114 is a burn or record button 126. In one embodiment of the invention, selection of the burn or record button 126 initiates a recording sequence to transfer the completed DVD project to optical media.

Below capture window 102, image capture and play back controls are shown in capture and editing control space 106. Also shown are exemplary editing control features 104a within editing control space 104. A remote control icon 108 is provided in one embodiment of the invention for the assignment of features to a button on a DVD player remote control, and for the preview and simulation of the functionality of a DVD remote control used with the menus and selections of the created DVD project.

Figure 5A:
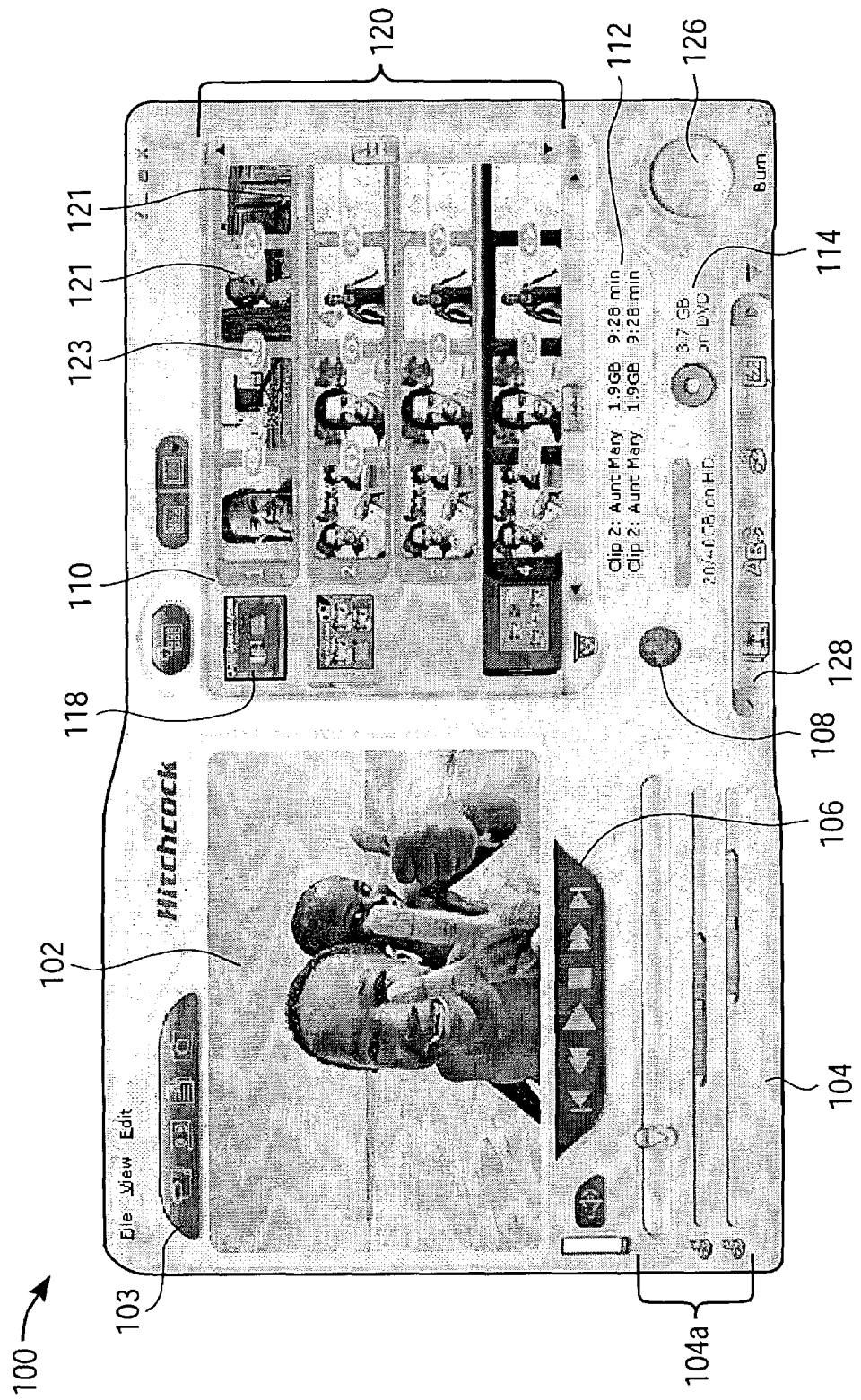
FIG. 5A shows an exemplary screen shot of the graphical user interface having content in the capture window and in the workspace window in accordance with one embodiment of the present invention.
Figure 5B:
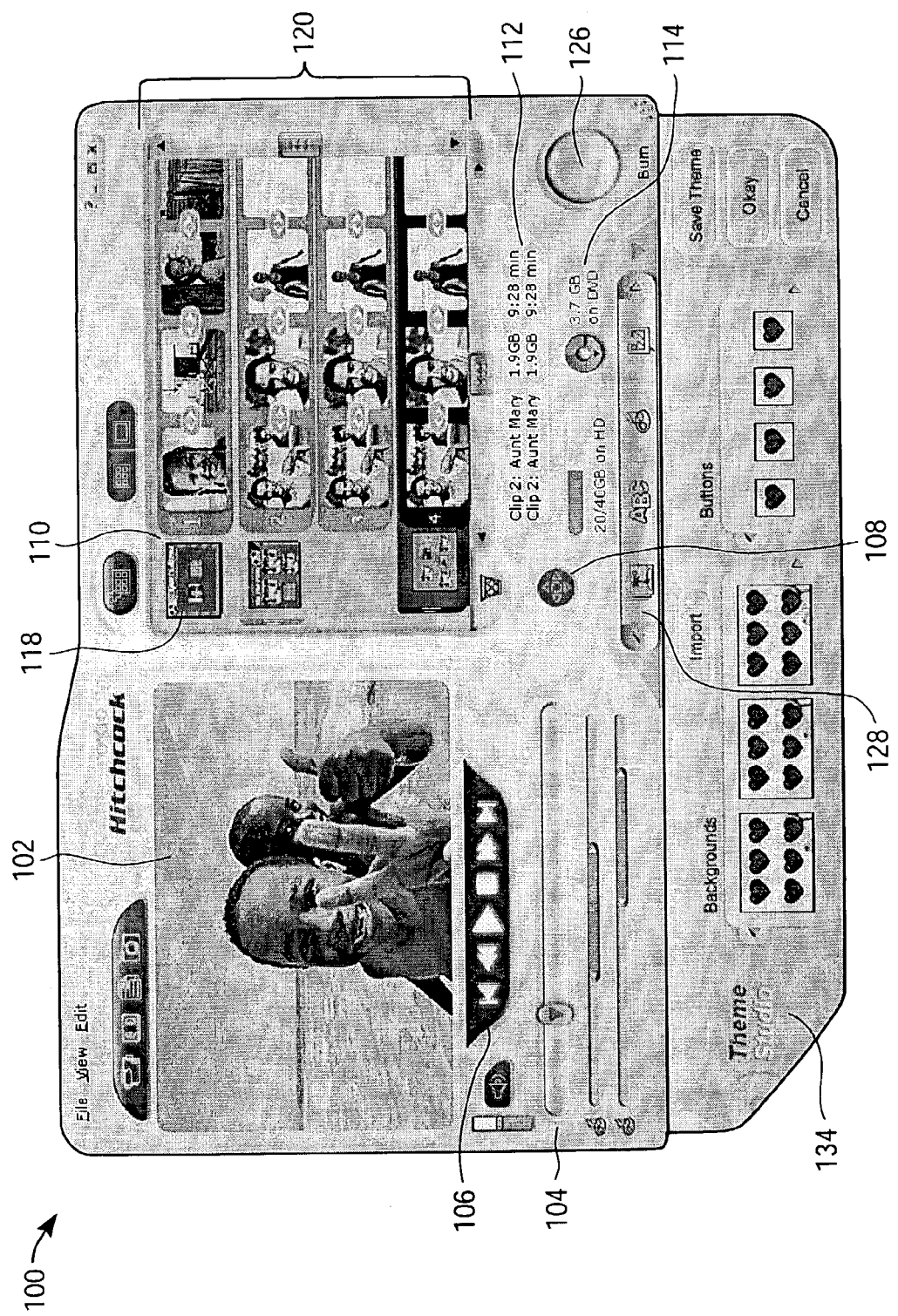
FIG. 5B illustrates a screen shot of the graphical user interface of another embodiment of the invention.

FIGS. 5A and 5B show exemplary screen shots of embodiments of the present invention illustrating various features as described in reference to FIGS. 1-4. FIG. 5A shows an exemplary screen shot of the GUI 100 having content in the capture window 102 and in the workspace window 110 in accordance with one embodiment of the present invention. In one embodiment, the image in capture window 102 is captured directly from an image source such as a video recorder, digital or analog camera, scanner, and the like. Capture source indication and selection buttons 103 are provided in one embodiment for selection and indication of the appropriate source. In one embodiment, a user can select a file image source to browse a local hard drive, peripheral drive, network source, or internet location for image content. In one embodiment, the user can open, for example, Windows® Explorer, and drag or copy an image source file directly into the capture window 102 where it is displayed.

Once the image content is displayed in the capture window 102, the image content can be edited as desired. Image capture and play back controls shown in capture and editing control space 106 can be used for basic positioning, selecting, and editing of movies and video. Editing control features 104a within editing control space 104 can be used for more advanced editing features such as brightness, contrast, fading, and the like, as well as manipulating and adding or editing a soundtrack to the image content. In one embodiment, once the image content has been edited as desired in the capture window 102, the user need only employ standard computer commands and methods such as drag and drop, select and right-click, and the like to move the edited image content from the capture window 102 to the workspace window 110.

In one embodiment of the present invention, the workspace window 110 contains sequences 120 of image content arranged in hierarchical order. Main menu 118 provides access to sequences 120 or sub-menus 122. Each sequence 120 can contain a plurality of image content, represented as thumbnail images 121. Each thumbnail image 121 can represent any of a plurality of types of image content including video clips, movies, photographs, scanned images, computer graphics, and the like. A feature of one embodiment of the present invention is the display in the workspace area 110 of a plurality of sequences 120, each containing one or more images or image content. The sequences 120 can then be graphically and visually manipulated and structured in the workspace window 110 to create the DVD project. In one embodiment, individual images or image content 121 can be moved within a sequence 120, to a different sequence 120, or placed in a new sequence 120. Entire sequences 120 can be manipulated to be arranged in a desired order, be subordinate to other sequences 120, or arranged in a structure and sequence as desired. The visual and graphic representation of the workspace window 110 of one embodiment of the present invention provides for the display of the sequences 120 as well as the images or image content 121 for a visual representation of the project structure.

The embodiment illustrated in FIG. 5A also shows content information in content information area 112, remote control icon 108, burn or record button 126, and control features 128. Transition indicators 123 are shown between images or image content 121 within each sequence 120. In one embodiment, transitions can be edited to create special effects between each of the images or image sequences 121 within each sequence 120. In one embodiment, the transition indicator 123 is either present or not present to indicate a transition has been inserted, or in another embodiment, the ever-present transition indicator changes color to indicate a transition has been selected or activated.

FIG. 5B illustrates a screen shot of the GUI 100 of another embodiment of the invention. In FIG. 5B, the capture window 102 contains a detailed image of the main menu 118 or a sub-menu 122, 122a. In the illustrated embodiment, a menu 118, 122, 122a, is selected in the workspace window 110 using standard computer conventions such as drag and drop, single-click, double-click, right-click, and the like. Selecting the menu 118, 122, 122a, presents a detailed view in the capture window 102 for editing. Editing can include, by way of example, adding, editing, or formatting titles, selecting and applying a theme, editing or formatting the buttons, and the like. In the example illustrated in FIG. 5B, a control feature 128 was selected for editing the theme of menus 118, 122, 122a. An editing tray or drawer 124 containing a plurality of tools and design functions for creation and editing of the selected control feature 128 is extended from the bottom of the GUI 100 providing access to such editing tools and features as theme selection, theme creation, backgrounds, buttons, and the like. Similarly, tools and design functions are provided for editing text, titles, adding and editing sound, and the like.

Figure 6A:
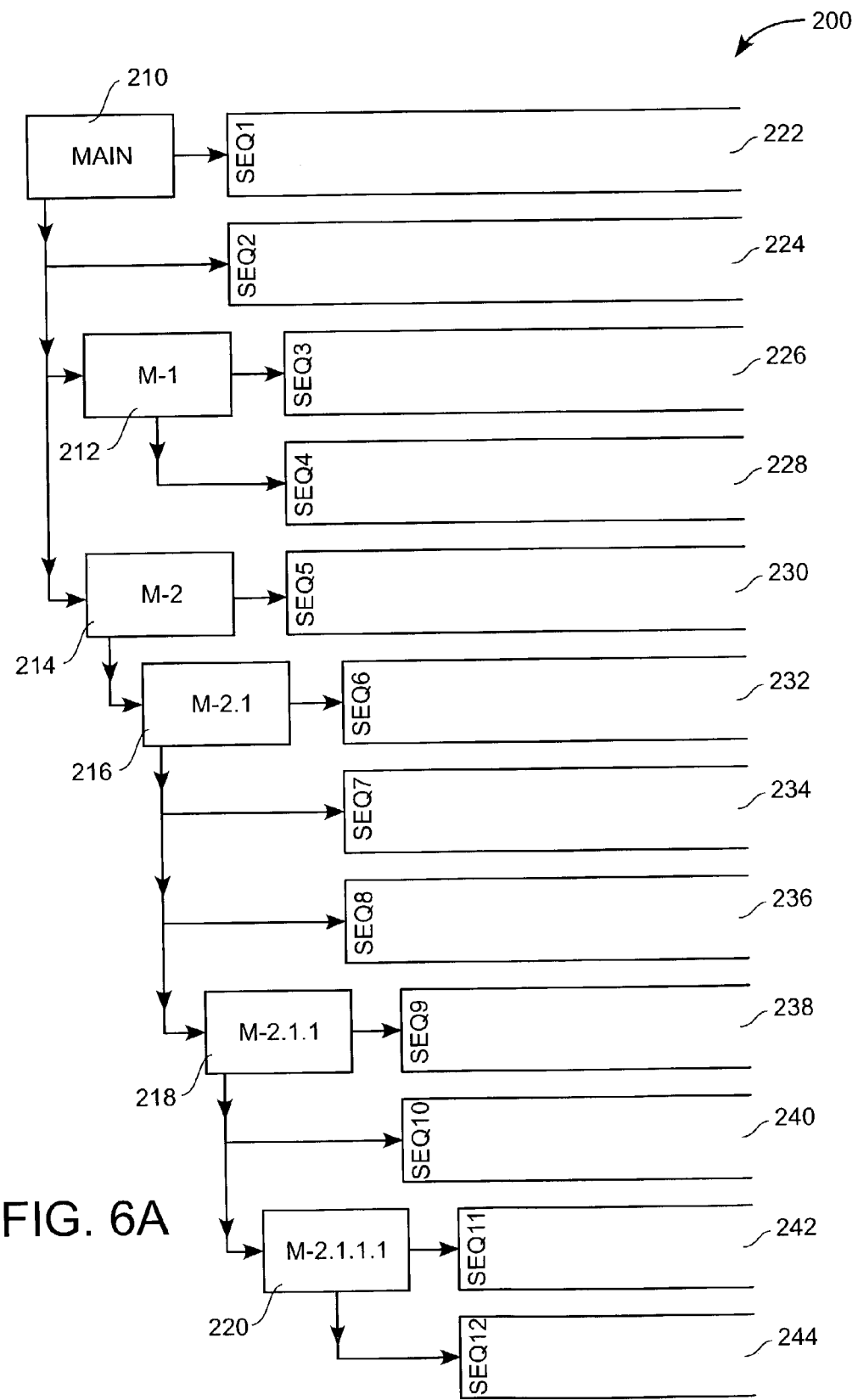
FIGS. 6A and 6B illustrate sequence hierarchical structure and menu relationships in accordance with an embodiment of the invention.
Figure 6B:
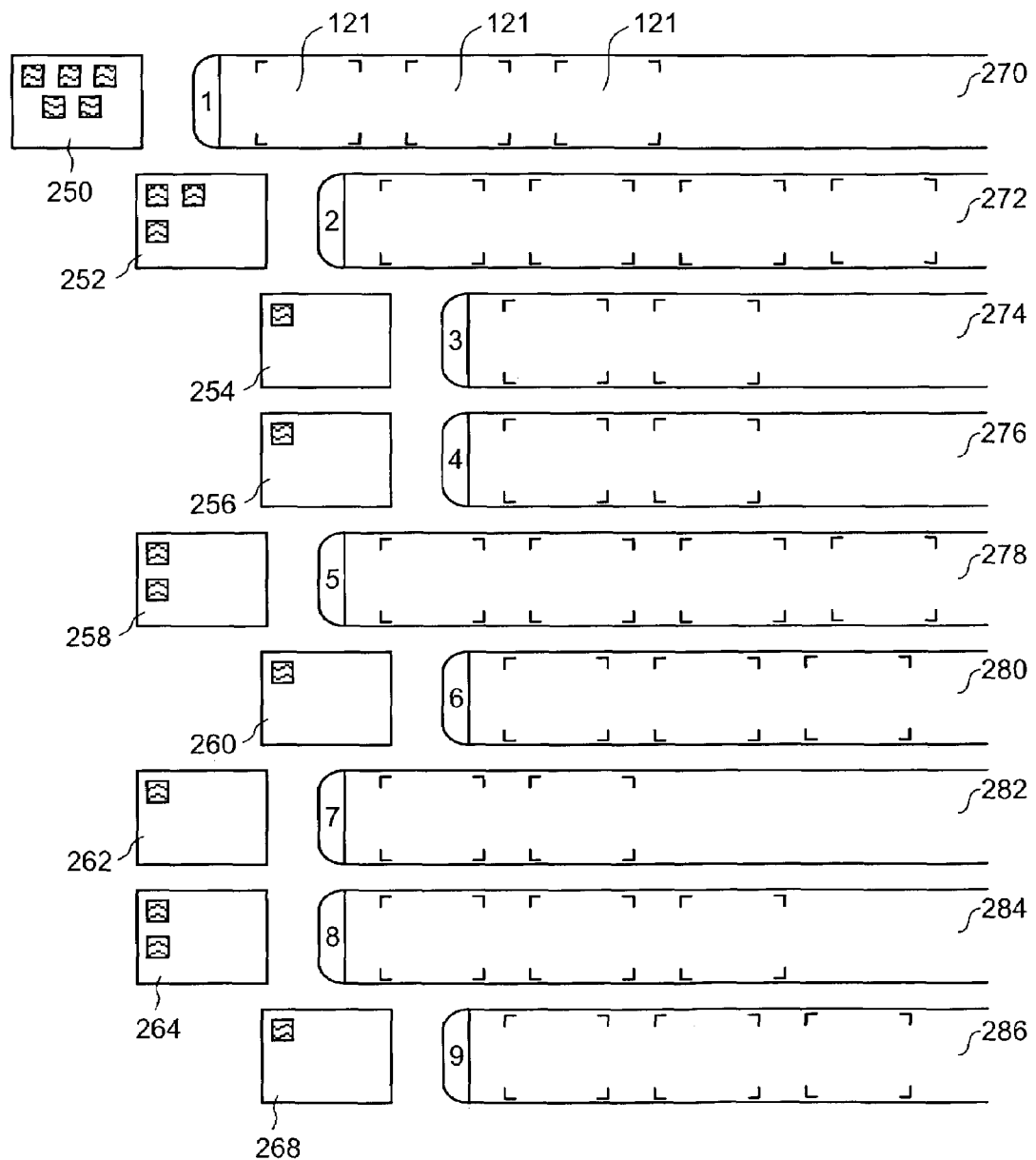

FIGS. 6A and 6B illustrate sequence hierarchical structure and menu relationships in accordance with an embodiment of the invention. In FIG. 6A, an exemplary structure tree 200 is illustrated. Main menu 210 is shown providing direct access to sequence 1 222 and sequence 2, 224, as well as menu M-1, 212 and menu M-2, 214. Menu M-1, 212 provides direct access to sequence 3, 226 and sequence 4, 228. Menu M-2, 214 provides direct access to sequence 5, 230, and menu M-2.1, 216, which provides direct access to sequence 6, 232, sequence 7, 234, sequence 8, 236 and menu M-2.1.1, 218. In this manner, the relationships between the menus and the sequences is graphically illustrated through menu M-2.1.1.1, 220 and sequence 12, 244 in FIG. 6A. Therefore, if one desires to view the content of sequence 11, 242, for example, one selects menu M-2, 214 from the Main menu 210, and then selects menu M-2.1, 216, from menu M-2, 214, and then selects menu 2.1.1, 218 from menu M-2.1, 216, and then selects menu M-2.1.1.1, 220 from menu M-2.1.1, 218, and finally selects sequence 11, 242, from menu M-2.1.1.1, 220. Although a seemingly somewhat complex path, a typical user is used to navigating menus in DVD through such options as, for example, Special Features, Out-takes, Out-takes with a specific performer, and then a filmography for the specific performer. In the illustrated example of FIG. 6A, the navigation is similar, and the visual and graphic representation provided in one embodiment of the present invention enables a typical or novice user to author a sophisticated project.

FIG. 6B shows a similar hierarchical structure as that shown in FIG. 6A using the menu and sequence conventions of the present invention. Menus are shown adjacent to each of a plurality of sequences illustrating what may be developed into a complex structure. By way of example, menu 254 associated with sequence 3, 274 has no children or subordinate menus or sequences. The structure is in place, however, for the later addition of subordinate sequences or menus, if desired, or the menu 254 can be deleted and the sequence 274 being directly accessible through menu 252.

In the following flowchart diagrams, functional description is provided to illustrate exemplary aspects of the claimed invention. However, these functional operations can be executed through any desired user interface. Some user interfaces require simple questions to be answered before proceeding to a next step, e.g., such as wizard interfaces, while others provide access to all feature functionality at all times. In one preferred embodiment, although the flowchart diagrams define yes/no decisions, the code that facilitates the claimed features enables access to all functions at all times, thus providing the maximum flexibility to use particular features as a user pleases.

Figure 7:
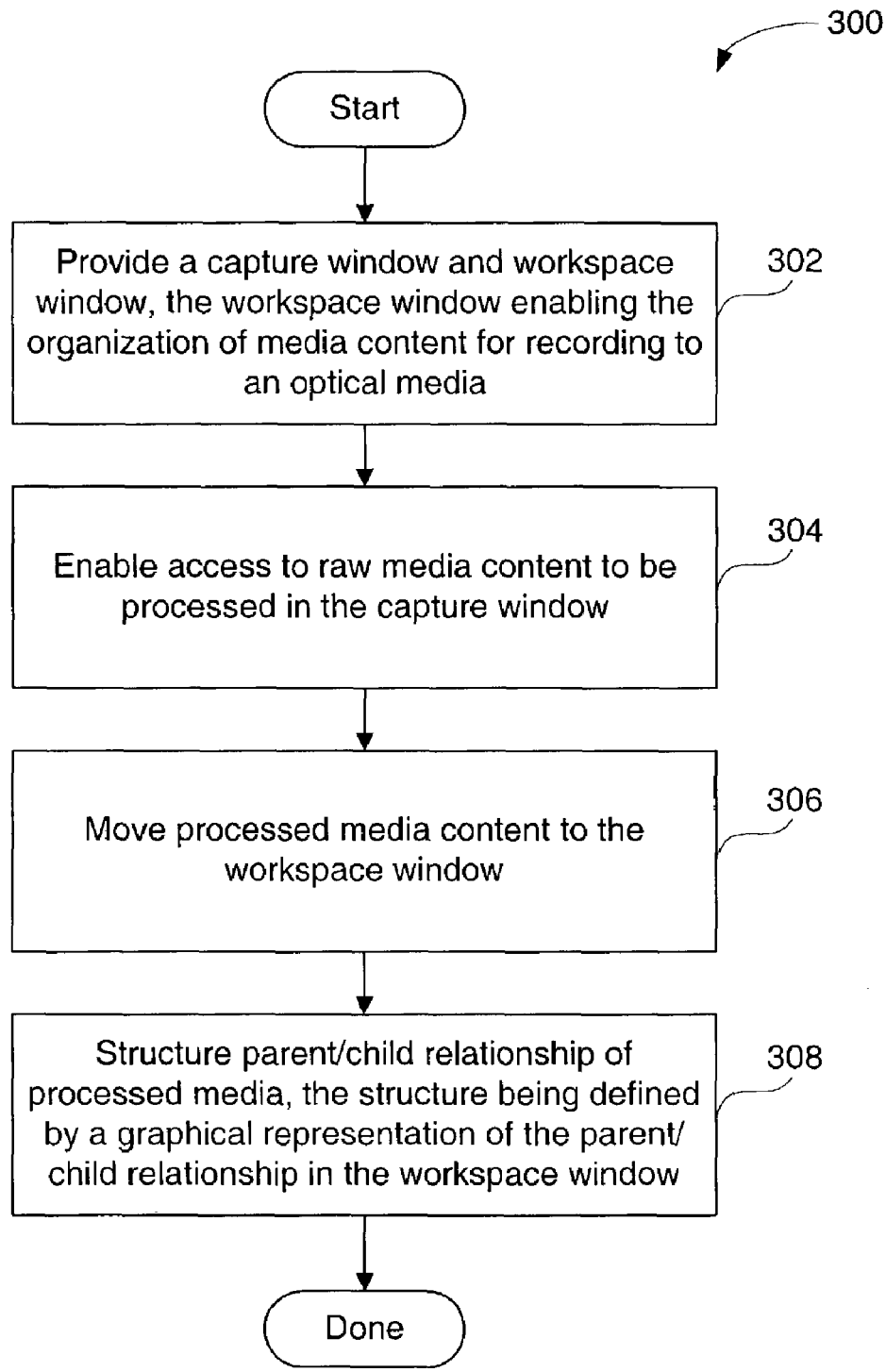
FIG. 7 shows a flowchart diagram of the method operations performed to author a project of multimedia content to be written to optical media in accordance with one embodiment of the present invention.

With the foregoing in mind, FIG. 7 shows a flowchart diagram 300 of the method operations performed to author a project of multimedia content to be written to optical media in accordance with one embodiment of the present invention. The method begins with operation 302 in which a capture window and a workspace window are provided. In one embodiment, the capture window and the workspace window are provided in a graphical user interface (GUI) to enable easy selection, manipulation, and editing of multimedia content. In one embodiment, the workspace window enables the organization of media content to be recorded to an optical media.

The method advances to operation 304 in which access to raw media is enabled to be processed in the capture window. In one embodiment, the capture window displays media content captured directly from a source such as a scanner, digital camera, analog camera, USB camera, digital video camera, a memory stick, previously recorded DVD, hard drive, peripheral drive, network, internet, and the like. In one embodiment, media content is captured and edited real time, and in one embodiment, previously recorded media content is downloaded from a source for processing, editing and use.

Once the media content has been processed as desired in the capture window, the method proceeds with operation 306 in which the processed media content is moved from the capture window to the workspace window. The method then continues with operation 308 in which processed media content is structured into parent and child, or subordinate, relationships between sequences of media content. The structure is defined and represented in a graphical representation of sequence and menu relationships in the workspace window. Having structured the relationships of the processed media in operation 308, the method is done.

Figure 8:
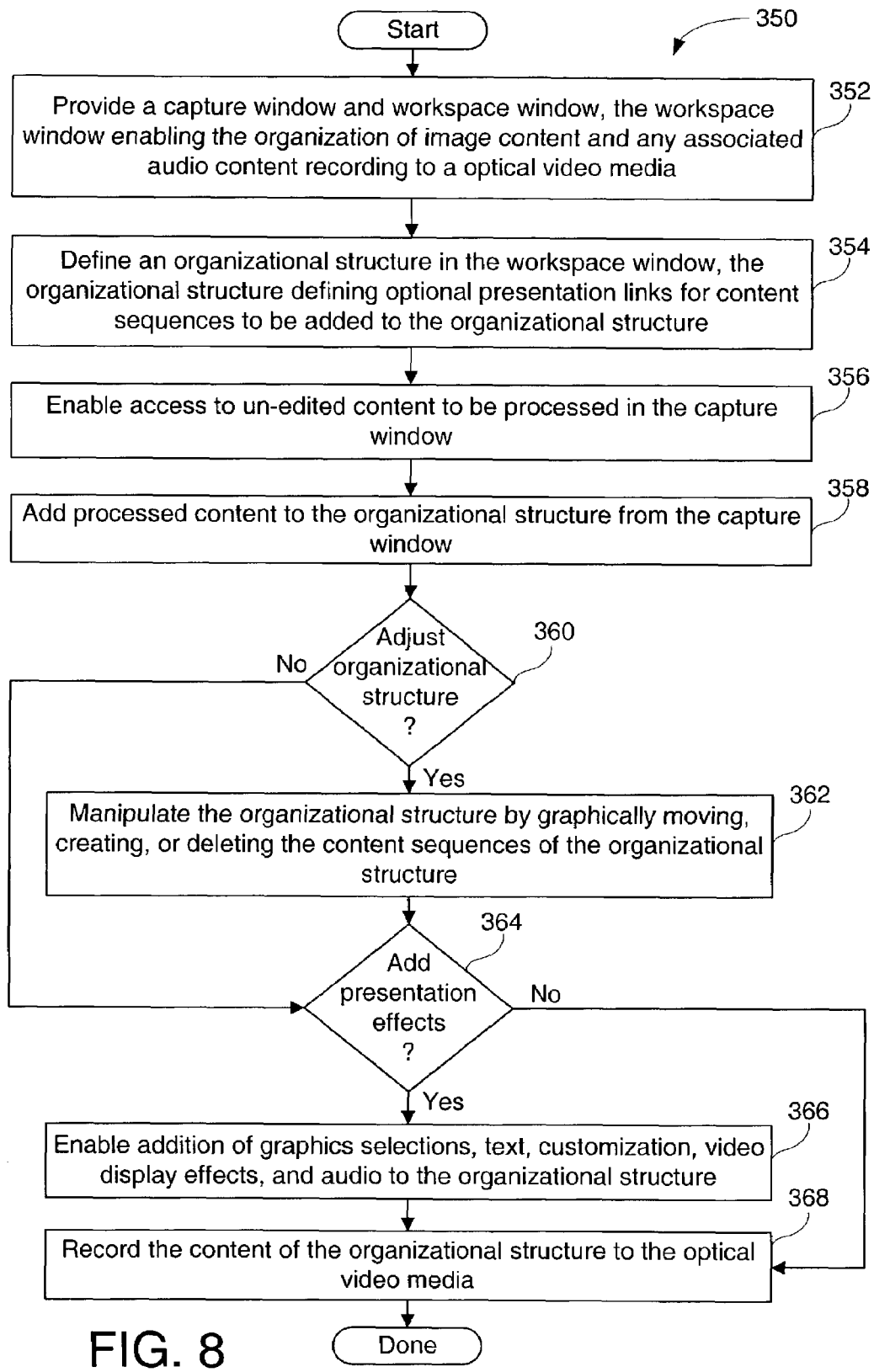
FIG. 8 shows a flowchart diagram illustrating the method operations performed in authoring a multimedia project to be written to optical media in accordance with an embodiment of the invention.

FIG. 8 shows a flowchart diagram 350 illustrating the method operations performed in authoring a multimedia project to be written to optical media in accordance with an embodiment of the invention. The method begins with operation 352 in which a capture window and a workspace window are provided. In one embodiment, the capture window and the workspace window are provided in a graphical user interface enabling selection, manipulation, editing, and presentation of content. The workspace window enables the organization of image content and any associated audio content to be recorded to an optical video media.

The method continues with operation 354 in which an organizational structure is defined in the workspace window. The organizational structure is a visual and graphic hierarchical structure that defines optional presentation links for image content sequences that will or can be added to the organizational structure.

Once the organizational structure is defined in operation 354, the method continues with operation 356 in which access to un-edited content is enabled to be processed in the capture window. The un-edited content can be from a plurality of sources including a scanner, digital camera, analog camera, USB camera, digital video camera, a memory stick, previously recorded DVD, hard drive, peripheral drive, network, internet, and the like. The processing includes basic editing including cropping, deleting scenes, and the like, as well as more advanced editing including image compilation, focus, contrast, brightness, special effects, and the like.

The method continues with operation 358 in which processed content is moved from the capture window into the organizational structure that was defined in operation 354. In one embodiment, the moving of processed content is by standard and usual computer methods and functions including drag and drop, right-click, and the like.

The method next evaluates the organizational structure in decision block 360. If the organizational structure needs to be adjusted, a "yes" to decision block 360, the method advances to operation 362 in which the organizational structure is manipulated or edited according to user desire. The method then advances to decision block 364. If the organizational structure does not need adjusting, a "no" to decision block 360, the method continues directly to decision block 364.

In decision block 364, the method provides the opportunity to add presentation effects. If presentation effects are desired, a "yes" to decision block 364, the method continues with operation 366 in which the addition of such effects as graphics selections, text customization, video display effects, and audio to the organizational structure are enabled. Effects are selected as desired, and the method advances to operation 368. If no presentation effects are desired, a "no" to decision block 364, the method proceeds directly to operation 368.

In operation 368, the method provides for the content of the organizational structure to be recorded to the optical video media. Once the content of the organizational structure is recorded, the method is done.

Figure 9:
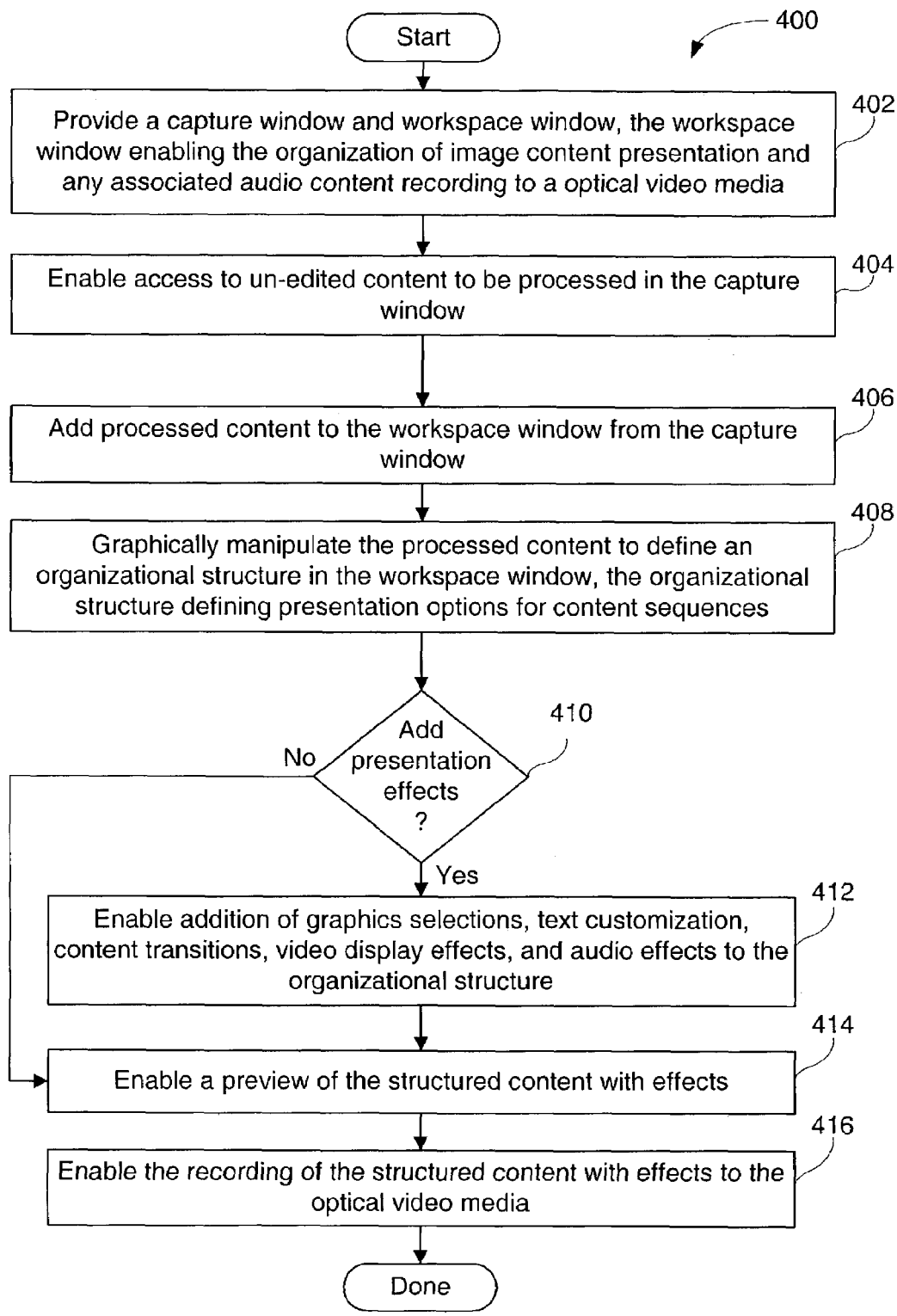
FIG. 9 shows a flowchart diagram illustrating the method operations performed in the authoring of multimedia content for writing to optical media in accordance with one embodiment of the present invention.

FIG. 9 shows a flowchart diagram 400 illustrating the method operations performed in the authoring of multimedia content for writing to optical media in accordance with one embodiment of the present invention. The method begins with operation 402 in which a capture window and a workspace window are provided. In one embodiment, the capture window and the workspace window are provided in a graphical user interface enabling capture, manipulation, editing, authoring and recording of image content. The workspace window enables the organization of image content and any associated audio content to be recorded to an optical video media.

The method continues with operation 404 in which access to un-edited multimedia content is enabled in the capture window. The multimedia content can be any of a plurality of media types, and the capturing can be real time, or download of previously recorded or captured image content. The processing of the image content can be of the most basic functions to options for advanced and technical editing functions.

The method advances to operation 406 in which the processed content is added to the workspace window from the capture window. Once the processed content has been added to the workspace window, the method next enables the graphical manipulation of the processed content in operation 408. The graphical manipulation of the content is to define an organizational structure in the workspace window, providing presentation options for content sequences.

In decision block 410, the method provides for the addition of presentation graphics. If presentation graphics are to be added, a "yes" to decision block 410, the method continues with operation 412 in which the addition of graphics selections, text customization, content transitions, video display effects, and audio effects to the organizational structure is enabled. The method then proceeds with operation 414. If no presentation effects are to be added, a "no" to decision block 410, the method proceeds directly to operation 414.

In operation 414, the method enables a preview of the structured content with effects, if any. In one embodiment, the preview is slower than the actual presentation from a recorded optical media as the processing of the information will occur as the content is presented, but it will allow a user to preview and evaluate the presentation of the finished project.

The method then continues with operation 416 in which the recording of the structured content with effects to optical video media is enabled. Once recorded, the method is done.

Although the flowchart operations have been described in a particular order, it should be understood that the order of execution may differ. In one example, the order of execution may proceed in parallel or serially depending on the specific algorithm and/or hardware implementation. In another example, the order of the functional operations may be rearranged.

It should be appreciated that some image content is better suited to recording to particular optical media. By way of example, a presentation of exclusively still images and graphics might more efficiently and economically be recorded to SCVD. In one embodiment of the present invention, the user can select from a plurality of target optical media including VIDEO CD (VCD), Super Video CD (SVCD), DVD, and any other video optical media.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the disclosure. It should be understood that although specific examples are provided with reference to a "computer," the term computer should be broadly interpreted to include any type of processing device. The computer can be a desktop computer, a portable computer, a hand-held device, a phone, a PDA, a set-top device, a networked device, etc. Accordingly, the present embodiments are to be considered as illustrative and not restrictive, and the invention is not to be limited to the details given herein, but may be modified within the scope and equivalents of the claims.

What is claimed is:

1. A computer implemented method for authoring a multimedia compact disc, comprising:

obtaining multimedia content from at least one source;

enabling manipulation of the obtained multimedia content; and arranging the obtained multimedia content in a graphical hierarchical tree structure, the arranging of the multimedia content graphically defines the hierarchical arrangement relative to other multimedia content to be recorded to the multimedia compact disc, the arranging includes configuring menus to provide direct access to each of a plurality of numbered multimedia sequences in the hierarchical arrangement from the menus, the menus include sub-menus corresponding to each of the plurality of numbered multimedia sequences, wherein, when any of the plurality numbered sequences is modified or deleted, the menus and the sub-menus are updated to reflect modifications or deletions in the plurality numbered sequences.

2. A computer implemented method for authoring a multimedia compact disc as recited in claim 1, wherein the enabled manipulation includes editing of the obtained multimedia content.

3. A computer implemented method for authoring a multimedia compact disc as recited in claim 1, wherein the graphical hierarchical tree structure is defined by at least one menu and at least one sequence of multimedia content.

4. A computer implemented method for authoring a multimedia compact disc as recited in claim 3, wherein the at least one menu includes at least a main menu.

5. A computer implemented method for authoring a multimedia compact disc as recited in claim 4, wherein the main menu can contain sub-menus, and each sub-menu can contain at least one sequence of multimedia content.

6. A computer implemented method for authoring a multimedia compact disc as recited in claim 1, wherein the graphical hierarchical tree structure is defined by a main menu that can define sub-menus and can define sequences of multimedia content, the sequences of multimedia content can be part of the main menu or part of the sub-menus, the sub-menus being arranged graphically to define parent-child relationship and the multimedia content being pictorially placed within sequences to define the hierarchical arrangement relative to other multimedia content.

7. A computer implemented method for authoring a multimedia compact disc as recited in claim 6, wherein individual multimedia content can be graphically moved to be associated with different sequences of multimedia content.

8. A computer implemented method for authoring a multimedia compact disc as recited in claim 6, wherein individual sequences of multimedia contact can be graphically moved to be associated with different sub-menus or the main menu.

9. A computer implemented method for authoring a multimedia compact disc as recited in claim 6, wherein each of the sub-menus and the sequences can be graphically moved to modify the parent-child relationship, wherein when parents of the sub-menus and parents of the sequences are automatically updated upon the graphical move.

10. A computer implemented method for authoring a multimedia compact disc as recited in claim 1, wherein the manipulation of the obtained multimedia content is enabled in a capture window graphical user interface.

11. A computer implemented method for authoring a multimedia compact disc as recited in claim 1, wherein the arranging of the obtained multimedia content is enabled in a workspace graphical user interface.

12. A computer implemented method for authoring a multimedia compact disc, comprising:
obtaining multimedia content from at least one source;
enabling manipulation of the obtained multimedia content;
arranging the obtained multimedia content in a graphical hierarchical tree structure, the arranging of the multimedia content graphically defines the hierarchical arrangement relative to other multimedia content, the arranging includes configuring menus to provide direct access to each of a plurality of numbered multimedia sequences in the hierarchical arrangement from the menus, the menus include sub-menus corresponding to each of the plurality of numbered multimedia sequences, wherein, when any of the plurality of numbered sequences is modified or deleted, the menus and the sub-menus are updated to reflect modifications or deletions in the plurality numbered sequences;
enabling selection of an optical media type from a list of supported optical multimedia types;
transforming the multimedia content into a format according to the selected optical multimedia type; and
triggering a recording of the arranged multimedia content that has been transformed into the selected optical multimedia type format to a multimedia compact disc.

13. A computer implemented method for authoring a multimedia compact disc as recited in claim 12, wherein the graphical hierarchical tree structure is defined by a main menu that can define sub-menus and can define sequences of multimedia content, the sequences of multimedia content can be part of the main menu or part of the sub-menus, the sub-menus being arranged graphically to define parent-child relationship and the multimedia content being pictorially placed within sequences to define the hierarchical arrangement relative to other multimedia content.

14. A computer implemented method for authoring a multimedia compact disc as recited in claim 13, wherein individual multimedia content can be graphically moved to be associated with different sequences of multimedia content.

15. A computer implemented method for authoring a multimedia compact disc as recited in claim 13, wherein individual sequences of multimedia contact can be graphically moved to be associated with different sub-menus or the main menu.

16. A computer implemented method for authoring a multimedia compact disc as recited in claim 13, wherein each of the sub-menus and the sequences can be graphically moved to modify the parent-child relationship, wherein when parents of the sub-menus and parents of the sequences are automatically updated upon the graphical move.

17. A computer implemented method for authoring a multimedia compact disc as recited in claim 12, wherein the manipulation of the obtained multimedia content is enabled in a capture window graphical user interface, and the arranging of the obtained multimedia content is enabled in a workspace graphical user interface.

18. Computer readable media containing program instructions for authoring a multimedia compact disc, the computer readable media comprising:
program instructions for obtaining multimedia content from at least one source;
program instructions for enabling manipulation of the obtained multimedia content; and
program instructions for arranging the obtained multimedia content in a graphical hierarchical tree structure, the arranging of the multimedia content graphically defines the hierarchical arrangement relative to other multimedia content to be recorded to the multimedia compact disc, the program instructions for the arranging includes program instructions for configuring menus to provide direct access to each of a plurality of numbered multimedia sequences in the hierarchical arrangement from the menus, the menus include sub-menus corresponding to each of the plurality numbered multimedia sequences, wherein, when any of the plurality numbered sequences is modified or deleted, the menus and the sub-menus are updated to reflect modifications or deletions in the plurality numbered sequences.

19. Computer readable media containing program instructions for authoring a multimedia compact disc as recited in claim 18, wherein the graphical hierarchical tree structure is defined by a main menu that can define sub-menus and can define sequences of multimedia content, the sequences of multimedia content can be part of the main menu or part of the sub-menus, the sub-menus being arranged graphically to define parent-child relationship and the multimedia content being pictorially placed within sequences to define the hierarchical arrangement relative to other multimedia content.

20. Computer readable media containing program instructions for authoring a multimedia compact disc as recited in claim 19, wherein individual sequences of multimedia contact can be graphically moved to be associated with different sub-menus or the main menu.

21. Computer readable media containing program instructions for authoring a multimedia compact disc as recited in claim 19, wherein each of the sub-menus and the sequences can be graphically moved to modify the parent-child relationship, wherein when parents of the sub-menus and parents of the sequences are automatically updated upon the graphical move.

* * * * *